(12) United States Patent
Holzmann et al.

(10) Patent No.: US 8,548,767 B2
(45) Date of Patent: Oct. 1, 2013

(54) MEASURING DEVICE WITH SERIAL DIGITAL INTERFACE

(75) Inventors: Gottfried Holzmann, Zorneding (DE); Werner Mittermaier, Erding (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 442 days.

(21) Appl. No.: 12/525,758

(22) PCT Filed: Feb. 7, 2008

(86) PCT No.: PCT/EP2008/000954
§ 371 (c)(1),
(2), (4) Date: Sep. 10, 2009

(87) PCT Pub. No.: WO2008/131814
PCT Pub. Date: Nov. 6, 2008

(65) Prior Publication Data
US 2010/0042354 A1    Feb. 18, 2010

(30) Foreign Application Priority Data
Apr. 25, 2007   (DE) .......................... 10 2007 019 543

(51) Int. Cl.
*G01R 31/319* (2006.01)
(52) U.S. Cl.
USPC ............. 702/122; 702/57; 702/119; 702/190; 455/67.11; 455/423; 455/424; 341/152; 341/162; 341/180; 370/250
(58) Field of Classification Search
USPC .......... 702/57, 75, 119, 122, 190; 455/67.11, 455/423, 424; 341/152, 162, 180; 370/250
See application file for complete search history.

(56) References Cited

U.S. PATENT DOCUMENTS

| | | | |
|---|---|---|---|
| 5,450,330 A * | 9/1995 | Zapisek | 716/136 |
| 6,587,671 B1 | 7/2003 | Kanago et al. | |
| 6,862,294 B1 * | 3/2005 | Hann et al. | 370/449 |
| 7,149,996 B1 | 12/2006 | Lysaght et al. | |
| 2004/0257060 A1 * | 12/2004 | Eibl et al. | 324/76.77 |
| 2006/0258293 A1 | 11/2006 | Steffen et al. | |
| 2007/0021934 A1 | 1/2007 | Vohrer | |

FOREIGN PATENT DOCUMENTS

| | | |
|---|---|---|
| CN | 1550070 | 11/2004 |
| DE | 10329396 A1 | 1/2005 |
| DE | 10337913 A1 | 3/2005 |
| EP | 1489866 A1 | 12/2004 |
| EP | 1564918 A1 | 8/2005 |
| WO | WO-03-021800 | 3/2003 |
| WO | WO-2004003583 A1 | 1/2004 |
| WO | WO-2006026799 A2 | 3/2006 |

OTHER PUBLICATIONS

International Search report for PCT/EP2008/000954 dated Jun. 23, 2008.

* cited by examiner

*Primary Examiner* — Alexander H Taningco
*Assistant Examiner* — Paul D Lee
(74) *Attorney, Agent, or Firm* — Marshall, Gerstein & Borun LLP

(57) ABSTRACT

The invention relates to a measuring device having at least one first assembly and at least one second assembly. The first assembly and the second assembly each comprise an intermediate frequency interface or a complex baseband interface. The intermediate frequency interfaces or baseband interfaces are designed as serial digital interfaces.

6 Claims, 1 Drawing Sheet

MEASURING DEVICE WITH SERIAL DIGITAL INTERFACE

BACKGROUND OF THE INVENTION

1. Field of the Invention

The invention relates to a measuring device with at least one high-frequency assembly and at least one baseband assembly, wherein the high-frequency assembly and the baseband assembly each provide at least one intermediate-frequency interface or complex baseband interface.

2. Related Technology

A measuring device, which provides at least two baseband assemblies and at least two high-frequency assemblies, is known from DE 103 37 913 A1. The assemblies can be connected to one another via switching devices to allow a variable assignment between different baseband assemblies and high-frequency assemblies. The use of a digital intermediate-frequency signal in a spectrum analyser is also known from DE 103 37 913 A1.

With relatively high dynamic requirements, which may, for example, amount to more than 12 bit parallel, a flexible connection of this kind between the baseband assemblies and the high-frequency assemblies is associated with considerable line costs and therefore also connection costs. This limits the possible number of components to be connected to one another.

SUMMARY OF THE INVENTION

The invention provides a measuring device with a flexible assignment of different assemblies, in which the line and connection costs are low.

Accordingly, a measuring device according to the invention comprises at least one first assembly and a second assembly, wherein the first assembly and the second assembly each provide at least one intermediate-frequency interface or complex baseband interface, wherein the intermediate-frequency interfaces or the complex baseband interfaces are serial digital interfaces.

The measuring device according to the invention comprises at least a first assembly and a second assembly. The first assembly and the second assembly each provide at least one intermediate-frequency interface or one complex baseband interface. According to the invention, the intermediate-frequency interface or the complex baseband interface are formed as a serial, digital interface. The formation of the interfaces as serial, digital interfaces has the advantage that, for each interface, only one line is required for the transmission of the intermediate-frequency signal or the complex baseband signal. Accordingly, the connection costs are considerably reduced by comparison with a parallel signal transmission. At the same time, level errors such as may occur through matching with an analog interface and through the frequency responses are prevented through the use of a digital interface. Crosstalk between the individual transmission paths is also prevented, so that associated level errors also cannot occur. In particular, the first assembly can be a high-frequency assembly, and the second assembly can be a baseband assembly.

In view of the relatively low line costs for the associated, relatively simpler connection possibility between, for example, the baseband assemblies and the high-frequency assemblies or further assemblies by comparison with the parallel transmission of the intermediate-frequency signal or of the complex baseband signal, a plurality of baseband assemblies and high-frequency assemblies or further assemblies can be connected to one another in a flexible manner in the measuring device according to the invention.

According to one preferred embodiment, the measuring device provides a connection device. This connection device provides at least two input terminals and two output terminals. Each of the input terminals can be connected to one or more selectable output terminals. Through the provision of such a connection device, the connection of the individual assemblies—the baseband assemblies and also the high-frequency assemblies or further assemblies—to one another is made possible with a single connection device in the measuring device. By unifying the interfaces of existing assemblies to be connected to one another within the measuring device as serial, digital interfaces, different assemblies, which are provided in a modular structure, can therefore also be used in the measuring device and connected to other, already-available assemblies. In particular, the connection device can transmit complex baseband signals and/or intermediate-frequency signals dependent upon which assemblies are present in the measuring device.

In this context, it is particularly advantageous if the connection device is a crossbar distributor. A crossbar distributor of this kind allows input terminals and output terminals to be connected to one another in a particularly simple manner. For example, nine input terminals and nine output terminals can be connected to one another in a flexible manner. In this context, the connection of the input terminals and output terminals is limited only in that respectively one input terminal can be connected to several output terminals; but, conversely, the connection of two input terminals to one output terminal is not possible.

According to a further, preferred embodiment, the first assembly and/or the second assembly provides respectively one parallel-serial converter. A particularly simple connection of the high-frequency assembly to the baseband assembly is guaranteed through the parallel-serial conversion within the respective high-frequency assembly or baseband assembly. Accordingly, a digital, serial signal arrives in each case in a uniform manner at the participating assemblies, independently of the bandwidth used within the relevant assembly.

By preference, an assembly is a baseband assembly, which provides at least one signal-generating unit and an analysis unit. In this context, a serial, digital interface in the baseband assembly is assigned respectively both to the signal-generating unit and also to the analysis unit. The individual signal branches within the baseband assembly can therefore be connected directly in each case to an input terminal or output terminal of the connection device or to corresponding digital, serial interfaces of another assembly.

Accordingly, one assembly in the measuring device is preferably formed as a high-frequency assembly with a transmission branch and a reception branch. The transmission branch connects a test terminal of the measuring device to an output terminal of the connection device, and the reception branch connects the test terminal of the measuring device to an input terminal of the connection device. The test terminals are disposed in the form of a bidirectional device interface of the measuring device directly on the high-frequency assembly. Accordingly, by exchanging a high-frequency assembly, the measuring device can be adapted for given uses and application areas.

According to a further preferred embodiment, the measuring device provides at least one interface assembly with at least one serial, digital interface. Processes at the level of the intermediate frequency or of the complex baseband signal can be implemented using an interface assembly of this kind. This can relate both to a signal which comes from the high-frequency end of the measuring device, and also to a signal which comes from the baseband end of the measuring device. One example for an interface assembly is a measuring-device interface, so that a device can be connected to the measuring device on the baseband level via the corresponding interface assembly.

In particular, it is preferred to provide within the baseband assembly an equalizer filter for the compensation of distortions of the at least one high-frequency assembly. In this manner, errors, which arise in the high-frequency assembly, for example, as a result of non-linearities, can be corrected within the baseband assembly.

BRIEF DESCRIPTION OF THE DRAWINGS

A preferred exemplary embodiment is presented in the drawings and explained in greater detail in the description below. The drawings are as follows:

FIG. 1 shows a measuring device 1, such as is used, for example, for testing mobile-telephone devices. In the exemplary embodiment explained and illustrated, digital, serial intermediate-frequency interfaces are assumed as the digital, serial interfaces. However, the embodiments also relate by analogy to digital, serial interfaces in the form of complex baseband interfaces.

Figure 1:
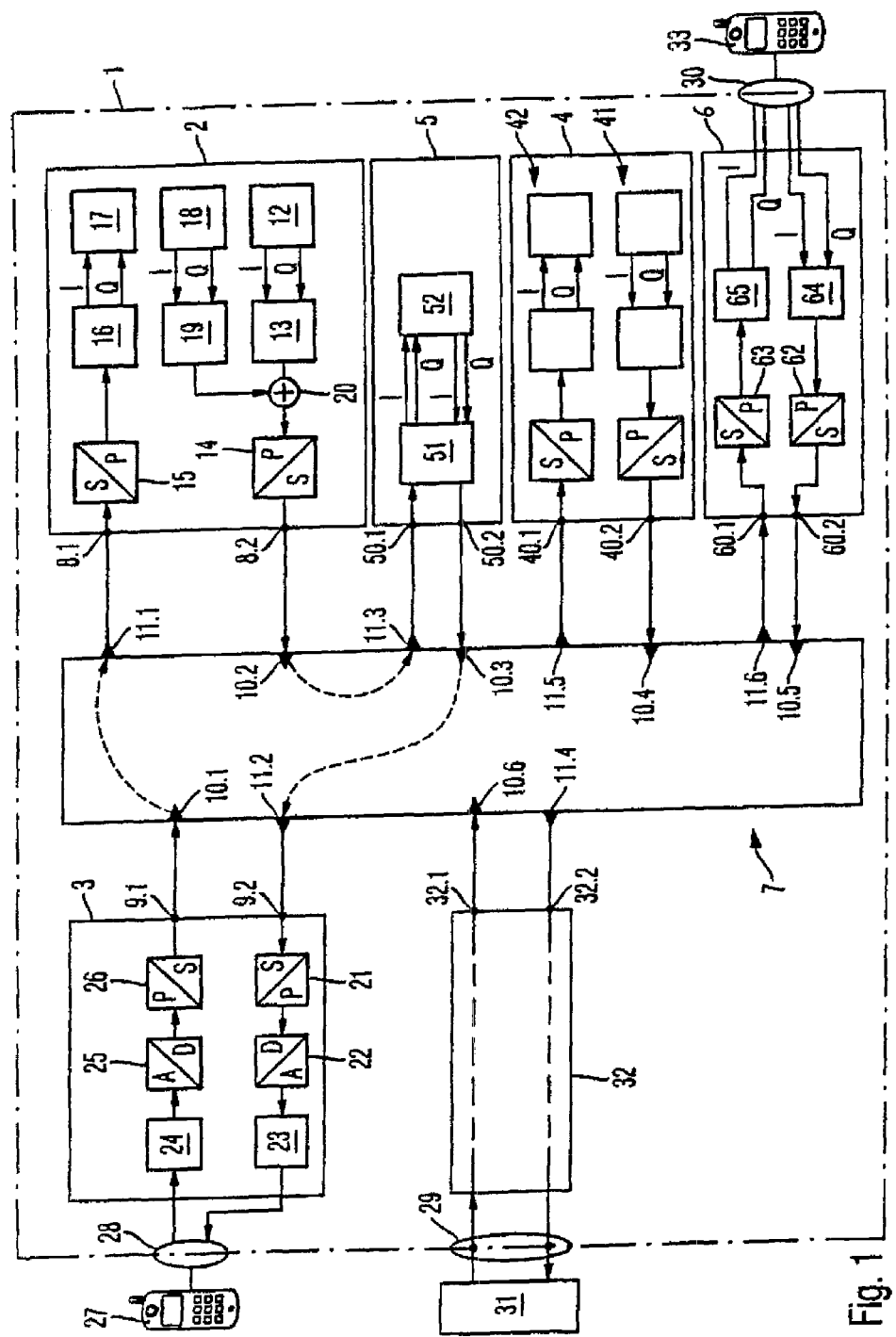
FIG. 1 shows a block-circuit diagram of a measuring device according to the invention with several baseband, high-frequency and interface assemblies.

On the one hand, a high-frequency signal, which is transferred to the mobile telephone device, is generated through the measuring device 1, and, on the other hand, the high-frequency signal returned from the mobile telephone device in response is analysed. The generation of a test sequence from which a high-frequency signal is subsequently generated, or respectively the analysis of the returned signal, is implemented on the baseband level. By contrast, the communication, that is to say, the transfer of signals to the device under test and the reception of signals returned from the device, is implemented on the high-frequency level. For this purpose, a baseband assembly 2 is provided in the measuring device 1 for the generation and analysis in the baseband, and a high-frequency assembly 3 is provided for communication with the device under test.

The baseband assembly and the high-frequency assembly are connected to one another via at least one intermediate-frequency interface, as explained in greater detail below.

Furthermore, a second and a third baseband assembly 4 and respectively 5 and an intermediate-frequency assembly 6 is also provided as an interface assembly in the measuring device 1 of the exemplary embodiment illustrated. A connection device 7 is provided for the connection of the individual assemblies of the measuring device 1 to one another and, in particular, for the flexible connection of the assemblies. A preferred embodiment of the measuring device 1 provides the connection device 7 as a crossbar distributor or multiplexer.

In order to connect the first baseband assembly 2 to the first high-frequency assembly 3, a first serial, digital intermediate-frequency interface 8.1 and a second serial, digital intermediate-frequency interface 8.2 are formed on the baseband assembly 2. In a corresponding manner, two intermediate-frequency interfaces are also formed on the high-frequency assembly 3. A first serial, digital intermediate-frequency interface 9.1 and a second serial, digital intermediate-frequency interface 9.2 are provided on the high-frequency assembly 3, in order to allow a transmission of intermediate-frequency signals from the baseband assembly 2 to the high-frequency assembly 3 or respectively in the reverse direction from the high-frequency assembly 3 to the baseband assembly 2.

The serial, digital intermediate-frequency interfaces 8.1, 8.2 and 9.1 and 9.2 are connected to one another via the connection device 7. For this purpose, a plurality of input terminals 10.1 to 10.6 is formed on the connection device 7. Furthermore, a plurality of output terminals 11.1 to 11.6 is formed on the connection device 7. In the illustrated exemplary embodiment, a first output terminal 11.1 of the connection device 7 is connected to the first serial, digital intermediate-frequency interface 8.1 of the baseband assembly 2. A first input terminal 10.1 is connected to the first serial, digital intermediate-frequency terminal 9.1 of the high-frequency assembly 3. In this manner, with corresponding control of the connection device 7, the first serial, digital intermediate-frequency interface 9.1 of the first high-frequency assembly 3 can be connected to the first serial, digital intermediate-frequency interface 8.1 of the first baseband assembly 2.

The second serial, digital intermediate-frequency interface 8.2 of the first baseband assembly 2 is connected to a second input terminal 10.2. The first high-frequency assembly 3 is connected at its second serial, digital intermediate-frequency interface 9.2 to a second output terminal 11.2. In the simplest case, a digital intermediate-frequency signal generated by the first baseband assembly 2 can accordingly be communicated via the second serial, digital intermediate-frequency interface 8.2 of the first baseband assembly 2 and the second serial, digital intermediate-frequency interface 9.2 of the first high-frequency assembly 3 to the first high-frequency assembly 3. For this purpose, the second input terminal 10.2 and the second output terminal 11.2 are connected to one another within the connection device 7. If the first input terminal 10.1 and the second output terminal 11.1 are additionally connected to one another, a signal received from the high-frequency assembly 3 can be communicated in the reverse direction to the baseband assembly 2.

While a simple exemplary embodiment, in which the first baseband assembly 2 is connected directly to the first high-frequency assembly 3, has been described above, FIG. 1 shows that the third baseband assembly 5 is additionally provided in order to vary the signal generated by the first baseband assembly 2. The third baseband assembly 5 can be, for example, a fading simulator. The third baseband assembly 5, which is illustrated only in a very simplified manner, also provides a first serial, digital intermediate-frequency interface 50.1 and a second serial, digital intermediate-frequency interface 50.2. The first digital, serial intermediate-frequency interface 50.1 is connected to a third output terminal 11.3 of the connection device 7. In the illustrated, preferred exemplary embodiment, the second input terminal 10.2 is connected to the third output terminal 11.3 within the connection device 7. The digital intermediate-frequency signal generated by the first baseband assembly 2 and routed to the connection device 7 is accordingly supplied to the third baseband assembly 5. After processing through the third baseband assembly 5, the intermediate-frequency signal is communicated via the second serial, digital intermediate-frequency interface 50.2 of the third baseband assembly 5, which is connected to a third input terminal 10.3 of the connection device 7, via the connection device 7, to the first high-frequency assembly 3. For this purpose, a connection between the third input terminal 10.3 and the second output terminal 11.2 is established within the connection device 7.

The corresponding connections of the exemplary embodiment described are illustrated in FIG. 1 as dotted-line arrows.

The first baseband assembly 2 provides a signal-generating unit 12, with which, for example, a test sequence is generated. The I/Q signals generated by the signal-generating unit are routed to a first intermediate-frequency transmission converter 13. Parallel signals (for example, 12-bit parallel) are generated by the intermediate-frequency converter 13. These parallel intermediate-frequency signals are converted into serial, digital intermediate-frequency signals. For this purpose, the intermediate-frequency transmission converter 13 is connected to a parallel-serial converter 14. The parallel-serial converter 14 converts the incoming parallel intermediate-frequency signals into serial, digital intermediate-frequency signals. In this context, only the conversion of the parallel, digital intermediate-frequency signals into serial, digital intermediate-frequency signals is implemented by the parallel-serial converter 14. The parallel-serial converter 14 is connected to the second serial, digital intermediate-frequency interface 8.2 of the first baseband assembly 2.

As has already been explained, the intermediate-frequency signal supplied in this manner to the connection device 7 is routed in the exemplary embodiment illustrated to the third baseband assembly 5. A transmission/reception converter 51, which also provides a serial-parallel converter and routes the I/Q signals generated in this manner to a fading unit 52, is disposed there. With the assistance of this fading unit 52, fading profiles can be set in a targeted manner. The signal processed according to the profile is returned in the reverse direction to the transmission/reception converter 51, which is connected not only to the first serial, digital intermediate-frequency interface 50.1 but also to the second serial, digital intermediate-frequency interface 50.2 of the third baseband assembly 5. Accordingly, a further-processed intermediate-frequency signal is routed via the second serial-digital intermediate-frequency interface 50.2 of the third baseband assembly 5 to the connection device 7 and through the latter to the first high-frequency assembly 3.

The first baseband assembly 2 further comprises a second signal-generating unit 18, which is connected to a second intermediate-frequency converter 19. The signal generated respectively by the first intermediate-frequency converter 13 and the second intermediate-frequency converter 19 is combined in a summation point 20, and the combined digital intermediate-frequency signal is routed to the parallel-serial converter 14. Accordingly, it is possible initially to generate two independent signal sequences, to combine them digitally as intermediate-frequency signals, and in this manner to realise a signal superposition.

In order to implement an analysis of signals, a serial-parallel converter 15 is also provided in the first baseband assembly 2. The serial-parallel converter 15 is connected, on the one hand, to the first serial, digital intermediate-frequency interface 8.1 and, on the other hand, to an intermediate-frequency reception converter 16. The intermediate-frequency reception converter 16 receives re-parallelised intermediate-frequency signals from the serial-parallel converter 15. These digital parallel intermediate-frequency signals are converted as I/Q signals into the baseband by the intermediate-frequency reception converter 16 and supplied as analog baseband signals to an evaluation unit 17.

A transmission branch and a reception branch are formed in the first high-frequency assembly 3. The transmission branch provides a further serial-parallel converter 21, which is connected to a digital-analog converter 22 and subsequently to a high-frequency transmission unit 23.

The reception branch provides a high-frequency reception unit 24, which is connected to an analog-digital converter 25 and subsequently to a parallel-serial converter 26. The parallel-serial converter 26 is connected to the first serial, digital intermediate-frequency interface 9.1 of the first high-frequency assembly 3. Within the first baseband assembly 2 and the first high-frequency assembly 3, in each case on the intermediate-frequency level, a conversion of the signals supplied in parallel within the assemblies 2 and respectively 3 into serial, digital signals is provided. In this manner, only one serial, digital intermediate-frequency signal need be transmitted via the connection device 7. By comparison with a transmission of parallel signals, the line cost and also, in particular, the number of switches in the connection of different assemblies, is thereby considerably reduced.

In order to connect the first high-frequency assembly 3 or respectively the measuring device 1 to a device under test, for example, a mobile telephone device 27, the first high-frequency assembly 3 is connected to a first test terminal 28. To allow an improved presentation of the systematic structure, the first test terminal 28 in FIG. 1 is not formed within the first high-frequency assembly 3. However, it is preferable to provide the measuring device 1 in a modular structure. The first test terminal 28 is then preferably formed directly on the first high-frequency assembly 3.

The second baseband assembly 4 illustrated in the measuring device 1 provides a further signal-generating branch 41 and a further analysis branch 42. The signal-generating branch 41 and the second evaluation branch 42 correspond in their structure in principle to that of the first baseband assembly 2. The description is therefore not repeated in this context.

In FIG. 1, an intermediate-frequency assembly designed as an interface assembly 6 is also presented. The interface assembly 6 is used in order to guide an intermediate-frequency signal out of the measuring device 1, in order to allow a test of a partially-completed mobile telephone device on the intermediate-frequency level, for example, during the development of a mobile telephone device.

For this purpose, the interface assembly 6 also provides a first serial, digital intermediate-frequency interface 60.1 and a second serial, digital intermediate-frequency interface 60.2. The first serial, digital intermediate-frequency interface 60.1 of the interface assembly 6 is connected to a sixth output terminal 11.6 of the connection device 7. Accordingly, a fifth input terminal 10.5 of the connection device 7 is connected to the second serial, digital intermediate-frequency interface 60.2. The interface assembly 6 connects the connection device 7 to a second test terminal 30 of the measuring device 1. A further parallel-serial converter 62 and a further serial-parallel converter 63 are disposed in the interface assembly 6. The further parallel-serial converter 62 is connected via a further intermediate-frequency transmission converter 64 to the second test terminal 30. By contrast, the further serial-parallel converter 63 is connected via a further intermediate-frequency reception converter 65 to the second test terminal 30. A total of four signals (I/Q in, I/Q out) are therefore transmitted via the second test terminal. For example, an only partially-functional mobile telephone device 33, in which the high-frequency components are not yet functional, can be connected to the second test terminal 30. Accordingly, measurements can be implemented on the mobile telephone device 33 at the baseband interface. In a manner not illustrated, a connection, for example, between the second input terminal 10.2 and the sixth output terminal 11.6, can be generated in the connection device 7, a connection from the baseband assembly 2 to the further mobile telephone device 33. Conversely, the digital intermediate-frequency signal, which is communicated from the further mobile telephone device 33 to the measuring device 1, can be communicated, via the connection device 7, by connecting the fifth input terminal 10.5 to the first output terminal 11.1 of the connection device 7, directly back to the first baseband assembly 2.

In this manner, a direct communication between the baseband assembly 2 and the further mobile telephone device 33 is possible on the intermediate-frequency level.

In the illustrated preferred exemplary embodiment, the first baseband assembly 2 is connected via the third baseband assembly 5, which contains a fading simulator 52, to the first high-frequency assembly 3. According to an alternative embodiment, a second high-frequency assembly 32 can also be provided. The second high-frequency assembly 32 also provides a first serial, digital intermediate-frequency interface 32.1 and a second serial, digital intermediate-frequency interface 32.2. The second high-frequency assembly 32 is connected via its first serial, digital intermediate-frequency interface 32.1 to the sixth input terminal 10.6 and via its second serial, digital intermediate-frequency interface 32.2 to a fourth output terminal 11.4 of the connection device 7. A digital intermediate-frequency signal arriving via the second serial, digital intermediate-frequency interface 32.2 is converted through the second high-frequency assembly 32 into an analog high-frequency signal and output via a third test terminal 29. For example, an external fading simulator 31 can be connected to the third test terminal 29. The signal processed in this targeted manner corresponding to a fading profile is communicated via the third test terminal 29 back to the measuring device 1, where it is supplied to the second high-frequency assembly 32. After the processing through the second high-frequency assembly 32, the attenuated signal, now once again available as a digital intermediate-frequency signal, is supplied, via the connection device 7, for example, to the mobile telephone device 27. For this purpose, the sixth input terminal 10.6 in the connection device 7 is connected to the second output terminal 11.2. Instead of the previously-implemented attenuation through the third baseband assembly 5, an output of a high-frequency signal is implemented in the last-named exemplary embodiment through the second high-frequency assembly 32, and an external attenuation is implemented via the external fading simulator 31. In the illustrated exemplary embodiment of FIG. 1, the third test terminal 29 is formed as a bi-directional interface for the de-coupling, wherein one port is available respectively for each transmission direction. Every external interface of the measuring device 1, to which a further device can be connected, is referred to within the meaning of the present invention as a test terminal. This further device can be either a device to be tested or an additional device such as a fading simulator 31 introduced for processing the signal.

The second high-frequency assembly 32 is structured substantially in an identical manner to the first high-frequency assembly 3. A repetition of the entire description is therefore not required.

For the specification of the connections within the connection device 7, the measuring device 1 is preferably fitted with a display, which is not illustrated in FIG. 1. The individual assemblies, that is to say, the high-frequency assemblies 3, 32, the baseband assemblies 2, 4 and 5 and the intermediate-frequency assembly 6 are presented, for example, in a symbolic manner, so that the connection of the individual assemblies is displayed and recognisable to a user.

The invention is not restricted to the illustrated exemplary embodiment. On the contrary, combinations of individual features with one another are also possible.

The invention claimed is:

1. Measuring device with at least one first assembly and a second assembly, wherein the first assembly and the second assembly each provides at least two intermediate-frequency interfaces or complex baseband interfaces, wherein:
   the first assembly is designed for the communication of signals to a device under test and for the reception of signals returned from the device under test and provides at least two intermediate-frequency interfaces or two complex baseband interfaces,
   the second assembly is designed for the generation of a test sequence and for the analysis of the returned signals and provides at least two intermediate-frequency interfaces or two complex baseband interfaces,
   the first assembly and the second assembly are connected by the intermediate-frequency interfaces or the complex baseband interfaces via a connection device, which provides at least two input terminals and at least two output terminals, wherein each input terminal is connected to one or more selectable output terminals, to one another, and to a third assembly with at least two intermediate-frequency interfaces or complex baseband interfaces for the variation of a signal generated by the second assembly,
   wherein the signals are supplied via the at least one first interface of the third assembly from the second assembly to the third assembly and the varied signal is routed via the at least one second interface of the third assembly to the first assembly,
   wherein the intermediate-frequency interfaces or the complex baseband interfaces of the first assembly and/or the second and/or third assembly are formed as serial digital interfaces, and
   wherein the first assembly and/or the second assembly and/or third assembly in each case provides a parallel-serial converter.

2. Measuring device according claim 1, wherein the connection device is a crossbar distributor.

3. Measuring device according to claim 1, wherein one assembly is a baseband assembly, which comprises at least one signal-generating unit and an analysis unit, and the signal-generating unit and the analysis unit are connected in each case to a serial, digital interface.

4. Measuring device according to claim 1, wherein one assembly is a high-frequency assembly, which provides a transmission branch and a reception branch, wherein the transmission branch connects a test terminal of the measuring device to an output terminal of a connection device, and the reception branch connects the test terminal of the measuring device to an input terminal of the connection device.

5. Measuring device according to claim 1, wherein the measuring device provides at least one interface assembly with a serial, digital interface.

6. Measuring device according to claim 1, wherein the second assembly is a baseband assembly that provides an equalizer-filter for the compensation of distortions of the at least one high-frequency assembly.

* * * * *